United States Patent [19]
Luckock et al.

[11] 3,944,689
[45] Mar. 16, 1976

[54] GLOSSY COATING COMPOSITIONS FROM COPOLYMERS OF VINYLIDENE FLUORIDE

[75] Inventors: Glenn W. Luckock, Natrona Heights; William V. Warnick, New Kensington, both of Pa.

[73] Assignee: PPG Industries, Inc., Pittsburgh, Pa.

[22] Filed: Oct. 22, 1971

[21] Appl. No.: 191,809

[52] U.S. Cl............ 427/385; 260/32.4; 260/32.6 R; 260/32.8 R; 260/33.4 F; 260/33.6 F; 260/900
[51] Int. Cl.².... C08K 5/07; C08K 5/16; C08K 5/20
[58] Field of Search ....... 260/328 A, 328 R, 33.4 F, 260/33.6 F, 32.8 F, 30.2, 900, 32.4; 427/385

[56] References Cited
UNITED STATES PATENTS

| | | | |
|---|---|---|---|
| 3,324,069 | 9/1967 | Koblitz | 260/31.4 |
| 3,340,222 | 9/1967 | Fang | 260/41 |
| 3,441,531 | 4/1969 | Koblitz | 260/29.1 |
| 3,454,518 | 7/1969 | Kelly | 260/31.4 |

*Primary Examiner*—Allan Lieberman
*Attorney, Agent, or Firm*—Frank J. Troy

[57] ABSTRACT

Continuous, glossy coatings are provided by compositions comprising a copolymer of vinylidene fluoride and tetrafluoroethylene or perfluoropropene and an acrylate polymer dispersed in a gloss enhancing solvent comprising 2-nitropropane, cyclohexanone or dimethylacetamide, or a combination of such solvents. The coatings obtained have the outstanding resistance and weatherability properties characteristic of fluoropolymer coatings.

14 Claims, No Drawings

GLOSSY COATING COMPOSITIONS FROM COPOLYMERS OF VINYLIDENE FLUORIDE

BACKGROUND OF THE INVENTION

Dispersions of poly(vinylidene fluoride) are known in the art and coating compositions containing a polymer of vinylidene fluoride as a major component are well known. For example, fluorinated olefin polymers containing 90 percent or more by weight vinylidene fluoride, a latent solvent for the vinylidene fluoride and an acrylate polymer have been successfully employed to provide coatings when baked from 125° to about 300°C. It is also known that copolymers of vinylidene fluoride wherein the minor constituent is a fluorinated comonomer, for example, tetrafluoroethylene, hexafluoropropene, chlorotrifluoroethylene, and the like, have been employed to produce compositions when blended with an acrylate polymer. Generally, however, in order to provide for glossy coatings when utilizing copolymers of vinylidene fluoride and tetrafluoroethylene it has been necessary to bake such compositions at relatively high temperatures in order to fuse the polymer. When air drying compositions are formulated, the gloss, when measured with a 60 degree gloss meter, is generally below 10 percent.

DESCRIPTION OF THE INVENTION

Now it has been discovered that coating compositions which can be dried at ambient temperatures to provide glossy coatings by utilizing a copolymer of vinylidene fluoride and tetrafluoroethylene or perfluoropropene and an acrylate polymer, dissolved and/or dispersed in a suitable solvent. More particularly, the invention relates to an air drying coating composition in which the vehicle comprises from about 20 percent by weight to about 70 percent based on the total weight of the vehicle solids, of a copolymer of vinylidene fluoride and tetrafluoroethylene or perfluoropropene and from about 30 percent to about 80 percent of an acrylate polymer. The vehicle composition is dissolved or dispersed in a gloss enhancing solvent selected from a member of the class consisting of 2-nitropropane cyclohexanone, dimethylacetamide and combinations thereof. Suitable blends include from about 90 parts 2-nitropropane and about 10 parts cyclohexanone and from about 0 percent to about 90 percent by weight based on the total solvent of dimethylacetamide. Other solvent(s) may be employed along with the above solvents or in various combinations therewith.

The fluorocarbon polymer employed in this invention is a copolymer of vinylidene fluoride with tetrafluoroethylene or perfluoropropene containing from about 95 percent to about 60 percent by weight of vinylidene fluoride and from about 5 percent to about 40 percent by weight of tetrafluoroethylene or perfluoropropene. An example of such a copolymer which is available commercially and is known as "Kynar-SL," has the following properties:

| | |
|---|---|
| Melting point | 122–126°C. |
| Heat distortion temperature | 95–103°C. |
| Heat of crystallization (66 psi) | 4.6 cal./g. |
| Specific gravity | 1.88 |
| Refractive Index ($n_D^{25}$) | 1.40 |
| Molecular weight (average) | 135–165,000 |
| Tensile Strength (35°C.) | 7200 |

Chemical analysis of "Kynar-SL" shows it to contain about 63 percent fluorine and the copolymer comprised of about 78 percent vinylidene fluoride and about 22 percent tetrafluoroethylene. Useful solutions of this copolymer are readily prepared by stirring the powdered copolymer into a solvent or solvent mixture which is heated to about 150°F. In order to prevent partial solvation and gel formation, it is recommended that the copolymer be added slowly while the solvent is continually agitated. Other methods can be used to incorporate this copolymer into the compositions of this invention, as disclosed hereinbelow.

Solvents which exhibit gloss enhancing characteristics are essential to this invention and for purposes of this invention, the preferred solvent mixture comprises about 90 parts by weight of 2-nitropropane and about 10 parts by weight of cyclohexanone. Not only does such solvent mixture provide for gloss enhancing properties, but other desirable characteristics such as good color stability, durability and non-blushing characteristics are also provided. This gloss enhancing solvent mixture may be employed with any of the above-mentioned solvents. However, in some instances, the 2-nitropropane or cyclohexanone may be utilized alone as the sole gloss enhancing solvent.

The proportions when three or more solvents are utilized will depend on the gloss desired and other film properties which are influenced by the particular solvent parameters. A particularly preferred, three component, gloss enhancing solvent combination that may be employed comprises the golio blend of 2-nitropropane - cyclohexanone and dimethylacetamide. When dimethylacetamide is used in addition to 90/10 blend of 2-nitropropane and cyclohexanone, the dimethylacetamide may be present in amounts from about 0 percent by total solvent weight to about 90 percent by weight or even higher and in some instances the sole gloss-enhancing solvent may be dimethylacetamide. In other instances the solvent mixture of 90/10 2-nitropropane and cyclohexanone may comprise the sole gloss enhancing solvent system. Thus, the gloss enhancing properties are exhibited by the dimethylacetamide alone; the 90/10 blend of 2-nitropropane and cyclohexanone or by a combination of the 90/10 blend along with the dimethylacetamide. Other non-gloss enhancing solvents such as those described above may be utilized with the 90/10 blend, with the dimethylacetamide or with the 90/10 blend of 2-nitropropane and cyclohexanone along with the dimethylacetamide. However, in the present invention, it is preferred to employ a three-solvent gloss-enhancing system comprising a 90/10 blend of 2-nitropropane and cyclohexanone along with the given amount of dimethylacetamide.

As mentioned hereinabove, the 90/10 blend of 2-nitropropane and cyclohexanone not only enhances the gloss of the coating compositions of this invention but also provides for good color stability, durability and reduces blushing when compared to other solvents.

Another solvent that may be used in combination with the 90/10 blend of 2-nitropropane-cyclohexane is dimethylacetamide.

The dimethylacetamide is of particular importance because usually as the proportion of the dimethylacetamide is increased, the gloss of the coating composition employing said solvent is also increased. Thus, the gloss of the coating compositions of this invention are readily further enhanced by additions of dimethylacetamide in addition to the 90/10 blend of 2-nitropropanecyclohexanone.

There are a large number of solvents which in most instances do not substantially affect the gloss of the compositions herein and which can be used in combinations with the gloss-enhancing solvents described above, for example, triethyl phosphate, dimethyl sulfoxide, N-methyl-2-pyrrolidone, dimethylformamide, ethyl acetate, methyl ethyl ketone, acetone, isophorone, methyl isoamyl ketone, pentoxone, methyl Cellosolve acetate, 1,4-dioxane, methyl isobutyl ketone, tetrahydrofuran, 1-nitropropane, Cellosolve acetate, ethyl isoamyl ketone, butyrolactone, dimethyl phthalate, carbitol acetate, diisobutyl ketone, propylene carbonate, diacetone acrylamide, butyl carbitol acetate, tributyl phosphate, amyl acetate, methanol, ethanol, N-propanol, isopropanol, N-butanol, pentanol-1, 2-ethyl butanol, 2-ethyl hexanol, cyclohexanol, ethylene glycol, propylene-1,3-butanediol, glycerol, m-cresol, diethylene glycol, ethyl lactate, 4-hydroxy-4-methyl-pentanone-2, acetic anhydride, 2-methoxy ethanol, 2-ethoxy ethanol, 2-butoxy ethanol, methyl carbitol, butyl carbitol, dimethyl, diethylene glycol, ethyl acetate, m-butyl acetate, chloroform, ethylene chloride, methylene chloride, trichloroethylene chlorobenzene, chloropropanol, epichlorohydrin, acetophenone, acetonitrile, nitromethane, nitrobenzene aniline, 2-pyrrolidone, ethylene cyanohydrin, toluene, xylene, ethyl benzene, hexane and the like.

Likewise, there are many suitable solvent blends that are useful, for example, listed below are some suitable mixtures:

| Solvent Blend | Ratio in Parts by Weight |
|---|---|
| Methyl isobutyl ketone/toluene | 3:1 |
| Methyl isobutyl ketone/cyclohexanone | 3:1 |
| Methyl isobutyl ketone/2-nitropropane | 3:1 |
| Methyl isobutyl ketone/ethyl acetate | 3:1 |
| Methyl ethyl ketone/cyclohexanone | 3:1 |
| Methyl ethyl ketone/toluene | 3:1 |
| Methyl ethyl ketone/2-nitropropane | 3:1 |
| Methyl ethyl ketone/methyl isobutyl ketone | 3:1 |
| Acetone/cyclohexanone | 3:1 |
| Acetone/toluene | 3:1 |
| Acetone/2-nitropropane | 3:1 |
| Acetone/methyl isobutyl ketone | 3:1 |
| Ethyl acetate/diisobutyl ketone | 1:1 |
| Dimethyl acetamide-cyclohexanone | 1:1 |
| Cyclohexanone/methyl isobutyl ketone | 1:1 |
| Cyclohexanone/methyl isobutyl ketone | 2:1 |
| Cyclohexanone/methyl isobutyl ketone | 4:1 |
| Cyclohexanone/dimethylacetamide | 1:2 |
| Cyclohexanone/dimethylacetamide | 3:1 |
| Cyclohexanone/dimethylacetamide | 2:1 |
| Cyclohexanone/methyl Cellosolve acetate | 1:1 |
| Cyclohexanone/methyl Cellosolve acetate | 2:1 |
| Cyclohexanone/methyl isobutyl ketone | 1:2 |
| Methyl Cellosolve acetate/methyl isobutyl ketone | 4:1 |
| Methyl Cellosolve acetate/dimethylacetamide | 4:1 |

The amount of non-gloss enhancing solvent employed is not critical and may vary from as low as about 10 percent to as high as about 90 percent based on weight of total solvent utilized.

In addition to the copolymers of vinylidene fluoride and tetrafluoroethylene or perfluoropropene and the solvent system hereinabove described, it is also necessary to employ an acrylate polymer in order to produce the glossy coating compositions of this invention.

Generally, the acrylate polymers employed in this invention comprise homopolymers and copolymers of alkyl acrylates and methacrylates having up to about 18 carbon atoms, as well as polymers of an amide of acrylic or methacrylic acid, particularly copolymers of such amides with another copolymerizable monomer.

Acrylate polymers that are suitable include poly(methyl methacrylate), poly(ethyl methacrylate), poly(n-butyl methacrylate), poly(n-hexyl methacrylate), poly(methyl acrylate), poly(ethyl acrylate), poly(n-butyl acrylate) and poly(2-ethylhexyl acrylate), as well as other polymers and copolymers made from monomers, such as methyl methacrylate, butyl acrylate, acrylamide, 2-ethylhexyl acrylate, decyl acrylate, methyl acrylate, ethyl acrylate, and the like. Functional monomers that are particularly useful include acrylic and methacrylic acids, hydroxyethyl acrylate and methacrylate, hydroxypropyl methacrylate and acrylate, dimethylaminoethyl acrylate and methacrylate and tertiarybutylaminoethyl acrylate and methacrylate.

Also included are acrylate polymers containing a functional group which is modified after the copolymerization, for example, a glycidyl methacrylate-containing polymer in which the epoxide group has been opened by carboxylic acids, alcohols, amines, ammonia, or phosphoric acids.

Particularly useful acrylate polymers are those of the type described in U.S. Pat. Nos. 3,194,777 and 3,276,905, that is, interpolymers of from about 50 percent to about 90 percent by weight of methyl methacrylate and 10 percent to 50 percent by weight of an alkyl ester of methacrylic acid in which the alkyd group contains from 8 to 18 carbon atoms.

Also suitable are those commercially-available thermoplastic acrylate compositions, for example, copolymers of methyl methacrylate, ethyl acrylate, butyl acrylate, 2-ethylhexyl acrylate, etc.

The amount of the particular acrylate polymer employed is not critical, however, the amount will influence the gloss, durability and flexibility among other properties. Generally, amounts from as low as about 30 percent to about as high as about 80 percent by weight, based on total weight of the vehicle solids, are utilized.

In addition to the copolymers of vinylidene fluoride and tetrafluoroethylene solvent system and acrylate polymer, other components may be incorporated to provide for internal plasticizing, overcome crazing and the like. Examples of such components include alkyd resins, cellulose derivatives, vinyl resins and the like.

The compositions of this invention can easily be pigmented. Any conventional pigment known in the art may be employed, for example, carbon black, chromic yellow, titanium dioxide, phthalocyanine greens and blues, toluidine red, metal oxides, sulfides and the various metallic flake pigments such as aluminum flake. In addition to color pigments, other additives used in coating compositions may be employed. These include fillers and extenders such as talc, clays, silicates, and diatomaceous earth. Other additives include bactericides, fungicides, flow agents, silicones and other film-forming materials such as nitrocellulose, polyvinyl acetal resins and the like.

The coating compositions of this invention are applicable to the coating of virtually any substrate, including steel, aluminum, zinc, copper, and numerous other metals, as well as wood, paper, glass, plastics, etc. The compositions are readily suitable for repairing previously coated surfaces, especially those coated with fluorocarbon polymers. Likewise, these coating compositions can be applied as one coat enamel and provide for the desired protection and appearance.

These coating compositions are generally applied to the substrate as a "thin layer", that is, a layer which can vary as a wet film thickness from about 0.5 mil or less to about 20 mils or higher. Essentially any application method can be used, including brushing, roll coating flow coating, spraying, etc.

As mentioned hereinabove, the coating compositions of this invention provide for glossy films which prior hereto could not be obtained. Whereas prior coating compositions comprising copolymers of vinylidene fluoride and tetrafluoroethylene only provided for films having a gloss of less than 10 percent when air dried, it is now possible to produce films having a high gloss when air dried, for example, a film having a gloss of as high as 84 percent is readily prepared by utilizing the gloss-enhancing solvent mixtures of this invention. In addition, the compositions of the invention have improved color stability and durability. Also noted is the improved non-blushing characteristics of such compositions.

The following examples illustrate in detail the preparation of the coating compositions of this invention. The examples are not intended to limit the invention; however, there are, of course, numerous possible variations and modifications thereof. All parts and percentages in the examples, as well as throughout this specification, are by weight unless otherwise indicated.

EXAMPLE I

The following components were blended and were ground in a conventional sand mill employing zirconium media until a Hegman reading of about 6.5 was obtained:

| | Parts by Weight |
|---|---|
| Acrylic resin* (35% solids in 2-nitropropane) | 40.0 |
| 2-nitropropane | 40.0 |
| Phthalocyanine blue | 72.7 |
| Chrome oxide green | 13.2 |
| Carbon black | 1.5 |
| Chrome yellow | 14.6 |
| Titanium dioxide | 33.12 |

*Comprising 70 percent by weight methyl methacrylate and 30 percent by weight ethyl acrylate.

This pigment paste was reduced with 467.0 parts of the acrylic resin above. Subsequently, 177.0 parts of a copolymer of 78 percent vinylidene fluoride and 22 percent tetrafluoroethylene were blended with 530.0 parts of nitropropane and heated to 175°F. until a substantially clear solution was obtained. On cooling, this solution was added to the above pigment paste. The coating composition thus obtained was applied to an aluminum panel having thereon a prime coat comprising a vehicle system containing 35.4 percent by weight of an acrylic resin comprising 10.0 percent acrylamide, 2.5 percent methacrylic acid, 42.5 percent ethyl acrylate, 25.0 percent methyl methacrylate and 20.0 percent methacrylonitrile, the said acrylic resin reduced to 45.0 percent weight solids with a blend of 33.0 percent xylene, 40 percent Solvesso 150 and 25.0 percent butyl Cellosolve; 14.3 percent by weight of the acrylic resin above and 50.3 percent by weight of poly(vinylidene fluoride). This resin system was pigmented with pigments as employed in the air-dry topcoat composition in a manner to obtain a pigment-to-binder ratio of about 0.38 to 1.0. This prime coat composition was applied in a manner to obtain 1.0 mil film thickness, said film was baked for about 2 minutes at 500°F. The air-dry composition of this invention was applied over the prime coat composition with a 0.070 drawbar. After drying, this topcoat composition had a gloss of 84 percent (85 degree gloss meter) and 40 percent (60 degree gloss meter).

Example I is illustrative of the glossy coating composition that can be produced by utilizing a 50:50 ratio of acrylate polymer (acryloid B-44) and a fluorocarbon polymer wherein substantially all of the gloss enhancing solvent is 2-nitropropane.

EXAMPLE II

A composition similar to that of Example I except that this example was applied at 20.3 percent total weight solids to an aluminum panel utilizing Nordson air-less spray system at from about 400 to 800 psi and at a temperature of from about 130°–200°F., the film produced had a gloss of about 5 percent (60 degree gloss meter); however, where the solids content was reduced to 18.4 percent by cyclohexanone, the film produced had a gloss of 56 percent (60 degree gloss meter). A gloss drop was noted after the film aged one day. This was probably due to further drying of the film, but when sprayed over a prime coat composition as used in Example I, the air-dry composition retained its gloss. Analysis showed gloss enhancing solvents to be in the following ratio: 91 percent 2-nitropropane and 9 percent cyclohexanone.

EXAMPLE III

An air-dry coating composition was made as in Example I except that during the formulating, the acrylate polymer was reduced to 35 percent total solids by employing a gloss-enhancing solvent mixture comprising 90 percent 2-nitropropane and 10 percent cyclohexanone and the fluorocarbon polymer solution was prepared in a 90/10 solvent blend of 2-nitropropane and cyclohexanone. The entire composition was reduced to 18.0 percent weight solids by employing the solvent ratio disclosed above. When this composition was drawn down with an 0.070 drawbar and the film produced was permitted to dry, the gloss of the film was 20 percent (60 degree gloss meter).

EXAMPLE IV

This air-dry coating composition was similar to Example III except that Example IV had a ratio of acrylate polymer to fluorocarbon polymer of 55:45 respectively. The gloss of the coating composition had a reading of 35 percent (60 degree of gloss meter).

EXAMPLE V

This example was similar to that of Example I except that the acrylate polymer employed was comprised of 95.8 percent by weight methyl methacrylate and 4.2 percent aminoethyl methacrylate, the said resin was prepared at 65.0 total solids content in toluene and subsequently cut to 35.0 percent solids content by employing a 90/10 blend of 2-nitropropane and cyclohexanone. In addition, in this example, part of the acrylate polymer was combined with the solvent blend and the fluorocarbon polymer and subsequently heated to dissolve said fluorocarbon polymer.

When this example was formulated into a coating composition at 18.0 percent total solids content, the films produced had a gloss of 34 percent (60 degree gloss meter).

EXAMPLES VI–VIII

These examples are similar to that of Example IV except that the ratio of acrylate polymer to fluorocarbon is increased. Table I set forth below tabulates the ratio employed and the gloss provided when such compositions were formulated into coatings:

TABLE I

|  | Ratio of Acrylate Polymer to Fluorocarbon Polymer | Gloss (60° meter) |
|---|---|---|
| Example VI | .60/40 | 50% |
| Example VII | 65/35 | 55% |
| Example VIII | 70/30 | 75% |

EXAMPLE IX

This example is similar to that of Example V except that Example IX contains therein a ratio of acrylate polymer to fluorocarbon polymer of 55/45. The gloss provided by compositions prepared thereof was 58 percent (60 degree gloss meter).

EXAMPLE X

This example was prepared in a manner similar to that of Example V; however, in addition to the 90/10 gloss-enhancing solvent mixture of 2-nitropropane and cyclohexanone, dimethylacetamide was employed in an amount to comprise 7.6 percent by weight of three solvents mentioned herein. The coating compositions produced were applied at a solids content of 30.0 percent and provided films having a gloss of 56 percent (60 degree gloss meter) when drawn down on an aluminum panel and air-dried to produce a film of 1.0 mil thickness.

EXAMPLE XI

The coating composition employed with this example was similar to that of Example V; however, the acrylate polymer employed was comprised of 77.5 percent methyl methacrylate, 20.0 percent methacrylonitrile and 2.5 percent methacrylic acid. When applied at 18.0 percent solids content, the gloss of the films produced was 57 percent (60 degree gloss meter).

EXAMPLE XII

Example XI was reproduced in a manner so that of the solvents employed dimethylacetamide comprised about 5.0 percent by weight of the total solvents. This composition provided for a gloss of 73 percent (60 degree gloss meter) when applied at a solids content of about 18.0 percent. It will be noted that an addition of dimethylacetamide increased the gloss about 16 percent units when compared to that of Example XI.

EXAMPLES XIII–XXI

To a control composition (composition of Example V at 20.0 percent total solids content) aliquots of dimethylacetamide range from 0.46 to about 21.6 percent by weight of 2-nitropropane, cyclohexanone and dimethylacetamide. All compositions were formulated at about 30.0 percent total solids. The gloss measurements were tabulated and set forth in Table II below:

TABLE II

|  | Percent Dimethylacetamide | Gloss (60°Meter) |
|---|---|---|
| Control - Example V at 20% solids content | 0 | 26% |
| Example XIII | 0.46 | 35% |
| Example XIV | 1.36 | 34% |
| Example XV | 2.24 | 44% |
| Example XVI | 3.10 | 47% |
| Example XVII | 3.96 | 56% |
| Example XVIII | 5.00 | 58% |
| Example XIX | 9.20 | 63% |
| Example XX | 15.50 | 65% |
| Example XXI | 21.6 | 67% |

It will be noted from the date of Table II that as the proportion of dimethylacetamide increased, there was a general increase in the respective gloss, thus reflective of the gloss-enhancing properties of dimethylacetamide.

Although the fluorocarbon polymer solution may readily be blended at ambient temperatures with the acrylate polymer to provide for a suitable resinous system it is in most instances preferred to admix the fluorocarbon polymer solution and the acrylate polymer and heat to about 200°–220°F. and maintain for about 1 hour. For example, resinous systems having a high degree of compatibility and improved clarity may be prepared by heating a composition comprising 383.0 parts 2-nitropropane, 17.0 parts cyclohexanone and 25.0 parts dimethylacetamide, to 150°F. and adding thereto slowly under constant agitation 50.0 parts of fluorocarbon polymer. This dissolved fluorocarbon polymer is then admixed with 125.0 parts of acrylate polymer (as in Example V) cut to 40.0 percent total solids, the admixture is then heated to about 212°F. and maintained for 1 hour. Such compositions have improved clarity and compatibility when compared to similar compositions wherein the fluorocarbon polymer and the acrylate polymer are admixed at ambient temperature.

In addition to the examples disclosed herein, various other compositions may be employed which also provide for glossy films. For example, the ratio of the fluorocarbon to acrylate polymer may be varied and other acrylate polymers may be employed in addition to or in substitution for those used hereinabove, for example, poly(methyl methacrylate) or poly(ethyl methacrylate) may be used.

Solvents other than those specifically set out in the examples may be utilized in addition to the preferred solvents and in various proportions, for example, isophorone, acetophenone, chloropropanol, dioxane and the like may be used along with the 2-nitropropane-cyclohexanone mixture of dimethylacetamide or other combinations.

Other pigments such as metal sulfides, phthalocyanine green or blue and the like may be used and additives such as bactericides, flow agents, silicones and the like may be used as desired.

According to the provisions of the Patent Statutes, there are described above the invention and what are now considered to be its best embodiments. However, within the scope of the appended claims, it is to be understood that the invention can be practiced otherwise than as specifically described.

We claim:

1. A coating composition which dries in air at ambient temperature to form a high gloss, continuous film, comprising:
   A. from about 20 percent to about 70 percent, based on the total weight of (A) and (B), of a fluorocarbon polymer comprising from about 95 percent to about 60 percent by weight of vinylidene fluoride and from about 5 percent to about 40 percent by weight of tetrafluoroethylene or perfluoropropene;
   B. from about 30 percent to about 80 percent, based on the total weight of (A) and (B), of an acrylate polymer;

wherein Components (A) and (B) are dissolved in gloss-enhancing solvent comprising a member selected from the class consisting of 2-nitropropane, cyclohexanone, dimethylacetamide, and combinations thereof.

2. The composition of claim 1 in which said gloss-enhancing solvent is a solvent mixture comprising:
   a. from about 10 percent to about 100 percent by weight, based on solvent, of a solvent blend of 90 parts 2-nitropropane and 10 parts cyclohexanone; and
   b. from about 0 percent to about 90 percent by weight, based on solvent, of dimethylacetamide.

3. A composition as in claim 1 wherein components (A) and (B) each comprise about 50 percent of the total weight of (A) and (B).

4. A composition as in claim 3 wherein said acrylate polymer is comprised of 70 percent by weight of methyl methacrylate and 30 percent ethyl acrylate.

5. A composition as in claim 3 wherein said acrylate polymer is comprised of methyl methacrylate and aminoethyl methacrylate.

6. A composition as in claim 1 wherein said gloss-enhancing solvent system is comprised of a 90/10 blend by weight of 2-nitropropane and cyclohexanone.

7. A composition as in claim 1 wherein said gloss-enhancing solvent system is comprised of a 90/10 blend of 2-nitropropane and cyclohexanone and from about 1 percent to about 25 percent by weight of dimethylacetamide.

8. A method of coating a substrate to form a high gloss, continuous film thereon consisting of:
   1. applying to said substrate a composition comprising:
      A. from about 20 percent to about 70 percent, based on the total weight of (A) and (B), of a fluorocarbon polymer comprising from about 95 percent to about 60 percent by weight of vinylidene fluoride and from about 5 percent to about 40 percent by weight of tetrafluoroethylene or perfluoropropene;
      B. from about 30 percent to about 80 percent, based on the total weight of (A) and (B), of an acrylate polymer;
   wherein components (A) and (B) are dissolved in a gloss-enhancing solvent selected from the class consisting of 2-nitropropane, cyclohexanone and dimethylacetamide, and combinations thereof; and
   2. drying said composition in air at ambient temperature to form said high gloss, continuous film.

9. The method as in claim 8 in which gloss-enhancing solvent system is a solvent mixture comprising:
   A. from about 10 percent to about 100 percent by weight, based on a solvent, of a solvent blend of 90 parts 2-nitropropane and 10 parts cyclohexanone; and
   B. from 0 percent to about 90 percent by weight, based on solvent, of dimethylacetamide.

10. A method as in claim 8 wherein component (A) and (B) each comprises about 50 percent of the total weight of (A) and (B).

11. A method as in claim 8 wherein said acrylate polymer is comprised of 70 percent by weight methyl methacrylate and 30 percent by weight ethyl acrylate.

12. A method as in claim 8 wherein said acrylate polymer was comprised of methyl methacrylate and amino-ethyl methacrylate.

13. A method as in claim 8 wherein said gloss-enhancing solvent system is comprised of a 90/10 blend by weight of 2-nitropropane and cyclohexanone.

14. A method as in claim 8 wherein said gloss-enhancing system is comprised of a 90/10 blend of 2-nitropropane and cyclohexanone and about 1 percent to about 25 percent by weight based on total solvent, of dimethylacetamide.

* * * * *